Jan. 13, 1959 W. G. CRITES 2,868,910
SAFETY IGNITION SWITCH FOR ENGINE IGNITION SYSTEMS
Filed July 28, 1955
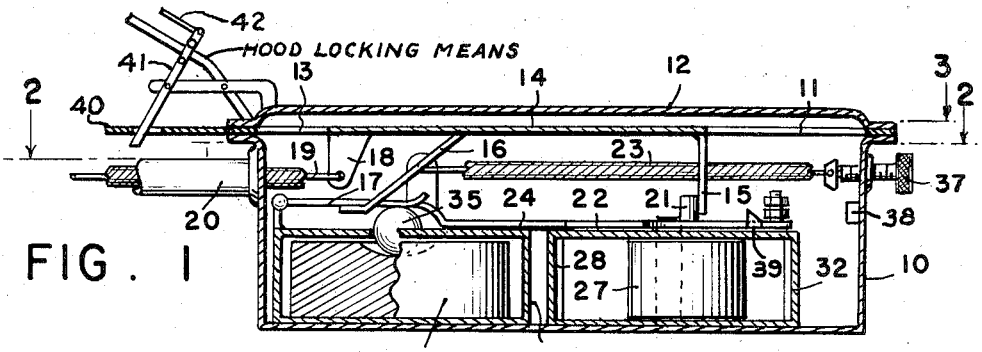
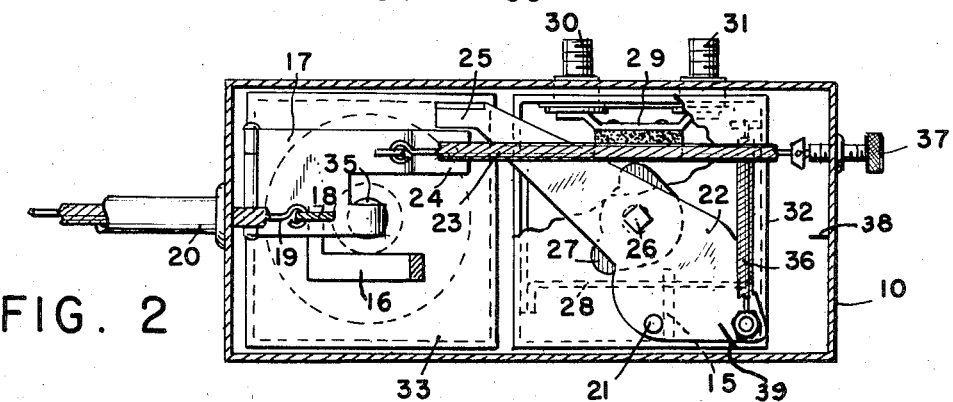
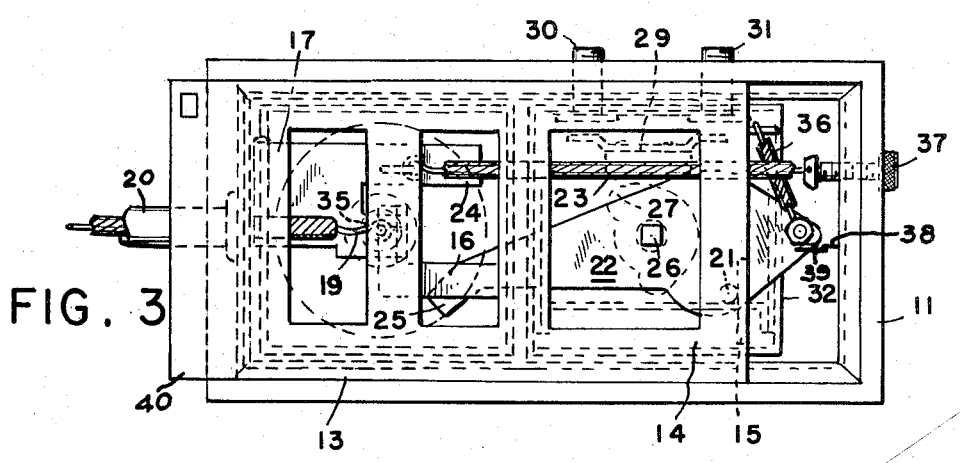
INVENTOR
WILLIAM G. CRITES
BY
*J. B. Dickman Jr.*
ATTORNEY 2,868,910

SAFETY IGNITION SWITCH FOR ENGINE IGNITION SYSTEMS

William G. Crites, Danville, Ill.

Application July 28, 1955, Serial No. 524,869

2 Claims. (Cl. 200—61.45)

This invention relates to safety cut-off switches for engine ignition systems or the like, which are responsive automatically to shock or to abnormally dangerous attitudes or other control conditions.

The general object of this invention is to provide safety means for cutting-off engine ignition systems or other operating circuits in the event of an accident, such as a collision, upset, loss of driver, etc., to prevent further damage especially from fire.

More specifically, the object is to provide a safety cut-off switch for an engine ignition system or the like which may be normally set in operating position and adjusted manually for various degrees of shock or abnormality of attitude, and which then responds automatically to cut-off the ignition system when a shock or abnormality in attitude is reached which exceeds the minimum set for.

A further object is to make this safety cut-off switch simple, requiring no special servicing, easy to operate and reliable in its operation.

Further and more specific objects will become apparent in the following detailed description, having reference to the accompanying drawings, wherein Fig. 1 is a sectional longitudinal view of an illustrative construction of one form of the invention, Fig. 2 is a plan view in section taken on the line 2—2 of Fig. 1, with the manual setting control in cocking position, and Fig. 3 is a similar view taken on the section line 3—3 of Fig. 1, and the switch in cut-off position.

The illustrated form comprises the container or switch-box 10, having a liner or gasket 11 and a cover 12 which may be fixed to the box by any means, such as bolts passed through the flanges and liner. The liner 11 is made narrow enough to leave grooves 13 on the long sides of the box between the flanges of the box and cover, to serve as guide grooves for the edges of a slide 14. This slide may be made of sheet metal, cut out as shown for lightness and to form an ear 15 bent down at right angles and a tongue 16 bent down obliquely to form a sliding stop under the hinged arm 17. Also a bracket 18 may be similarly formed or welded to the slide.

Slide 14 is manually operated by a stiff wire 19 connected to bracket 18 and guided through the end wall of the box 10 by means of conduit 20 to a control position somewhere near the operator or driver. During operation of this control where the wire 19 is pulled out, ear 15 engages post 21 on cocking lever 22 to move this lever to cocking position as shown in Figs. 1 and 2, while the end of tongue 16 has moved out from its position between the ball 35 and lever 17 and has permitted lever 17 to drop in contact with the ball, but in the meantime end 25 of the cocking lever, in approaching the trigger end 24 of lever 17, has slipped under the trigger end by reason of having a bevelled leading edge on top and the trigger end having its approached edge bevelled on the bottom. As soon as end 25 has passed end 24 and cleared it, when wire 19 has been fully pulled out, end 24 snaps down by reason of the spring tension of spring 23 on the lever 17, and lever 17 drops down in contact with ball 35. Wire 19 may now be pushed in sufficiently to permit automatic activation of the safety switch as described hereinafter. The switch may be manually cut off by pushing wire 19 in all the way to bring the end of tongue 16 over the ball 35 thus raising lever 17 and tripping the trigger to release the switch in a manner more fully described in the following paragraphs. Manual cut-off may be desirable at times, such as when storing cars, etc.

Cocking lever 22 is fixed to a shaft 26 which is integral with cam 27 operating a cross-head 28 on which a contact connector spring strip 29 is insulatedly mounted for connecting contact terminals 30 and 31, while the cocking lever is in cocked position as shown in Figs. 1 and 2. Terminals 30 and 31 are insulatedly mounted in the side wall of switch box 10 and may be connected in any operating circuit which it is desired to break upon any abnormal derangement or shock upon the device.

Cam 27 and cross-head 28 may be enclosed by a casing 32 to retain a lubricant for the moving parts and to keep dirt out. A similar casing 33 may be used as an enclosure for a weight 34 loosely mounted therein to have a limited shifting motion off from a normally centralized position, in response to shock from any direction or abnormal derangement in attitude.

The weight 34 is normally held in its centralized position by the pressure of the hinged arm 17 on a ball 35 guided in a central opening in the top of casing 33 and resting in a spherical depression in the center of the top of weight 34, this depression having a larger radius than the ball. Upon abnormal derangement or shock to the vehicle or apparatus in which this device is mounted, the weight 34 will shift from its centralized position, causing the ball to rise up a side of the depression and thus raise the hinged arm 17 and its trigger end 24 out of the way of the cocking lever, permitting operating spring 36 to turn the cam 27 to operate the cross-head 28 to open the switch as shown in Fig. 3.

The degree of shock or derangement which will trigger the device may be finely adjusted for by means of adjusting screw 37, which varies the tension of spring 23 on the hinged lever 17 and in turn its pressure on the ball to retain the weight in its centralized position.

Switch box 10 may be provided with an insulated terminal contact 38, for cooperation with a grounded contact 39 on the cocking lever 22 to short circuit the generator on the engine when the lever 22 is released as shown in Fig. 3.

A further safety feature against unauthorized persons lifting the hood may be provided in conjunction with the setting of the switch device to operate on safety, i. e., when the control wire 19 is pulled to cock the lever 22. By providing an outwardly extending portion 40 on the end of the slide 14 outside of the switch box 10, to cooperate with the hooklocking lever 41, the hood will be automatically locked until the sliding wire 42 connected up to the dash is pulled to operate lever 41 to unlock the hood and at the same time release slide 14 to its normal operative position permitting release of cocking lever 22 and opening of the ignition switch and closing of the generator short circuit when contacts 38 and 39 are used. Until the hood lock is thus unlocked from the dash, the hood cannot be opened and tampering with the engine is thus prevented.

Of course, the construction and arrangement of the parts as shown in the drawings and hereinabove de-

What is claimed is:

1. A switch-box having a pair of terminals for connection in an operating circuit such as an engine ignition system, electrical contacts at the inner ends of said terminals, a connector strip for connecting said contacts to complete the circuit, means in said box for resiliently breaking said connection, trigger means in said box for making and holding said connection, means for resetting the trigger means, said resetting means having a portion extending through the wall of the box for manual setting from the outside, said portion comprising a wire, a slidable plate in said box to which said wire is connected, having cut out portions for lightness and to form an ear and a resilient tongue, for cocking said connection making trigger means and moving the trigger portion temporarily out of the way of the cocking portion respectively, and laterally shiftable weight means in said box cooperating with said trigger means, upon tilting or receiving a shock, to release said trigger means to break said connection.

2. A switch box having a pair of terminals for connection in an operating circuit such as an engine ignition system, electrical contacts at the inner ends of said terminals, a connector strip for connecting said contacts to complete the circuit, means in said box for resiliently breaking said connection, trigger means in said box for making and holding said connection, means for resetting the trigger means, said resetting means having a portion extending through the wall of the box for manual setting from the outside, said portion comprising a wire, a slidable plate in said box to which said wire is connected, having cut out portions for lightness and to form an ear and a resilient tongue, for cocking said connection making trigger means and moving the trigger portion temporarily out of the way of the cocking portion respectively, said cocking portion including a lever on said connection making means, resilient means to bias said lever in a connection breaking position, a post on said lever to cooperate with said ear during cocking operation, and laterally shiftable weight means in said box cooperating with said trigger means, upon tilting or receiving a shock, to release said trigger means to break said connection.

References Cited in the file of this patent

UNITED STATES PATENTS

| | | |
|---|---|---|
| 1,662,979 | Nelson | Mar. 20, 1928 |
| 2,206,067 | Waltamath | July 2, 1940 |
| 2,539,736 | Fraser | Jan. 30, 1951 |
| 2,553,708 | Harmon | May 22, 1951 |
| 2,585,749 | Di Lorenzo et al. | Feb. 12, 1952 |
| 2,637,791 | Bleier | May 5, 1953 |

FOREIGN PATENTS

| | | |
|---|---|---|
| 649,415 | Great Britain | Jan. 24, 1951 |